(12) United States Patent
Kakehi

(10) Patent No.: US 7,840,815 B2
(45) Date of Patent: Nov. 23, 2010

(54) DIGITAL SIGNATURE COMPUTER, SYSTEM, METHOD, AND STORAGE MEDIUM STORING PROGRAM FOR COLLECTIVELY AFFIXING SIGNATURE TO PLURALITY OF MESSAGES

(75) Inventor: Rumiko Kakehi, Yokohama (JP)

(73) Assignee: Fuji Xerox Co., Ltd., Tokyo (JP)

(*) Notice: Subject to any disclaimer, the term of this patent is extended or adjusted under 35 U.S.C. 154(b) by 1266 days.

(21) Appl. No.: 11/343,999

(22) Filed: Jan. 31, 2006

(65) Prior Publication Data

US 2007/0016788 A1   Jan. 18, 2007

(30) Foreign Application Priority Data

Jul. 13, 2005   (JP)   ............... 2005-204972

(51) Int. Cl.
*H04L 9/32* (2006.01)
*H04K 1/04* (2006.01)

(52) U.S. Cl. .................................. 713/176; 380/37
(58) Field of Classification Search .............. 713/179, 713/170, 176, 180
See application file for complete search history.

(56) References Cited

U.S. PATENT DOCUMENTS

| | | | | |
|---|---|---|---|---|
| 5,719,940 A | * | 2/1998 | Ahn et al. | 713/176 |
| 5,748,738 A | * | 5/1998 | Bisbee et al. | 713/176 |
| 5,825,880 A | * | 10/1998 | Sudia et al. | 713/180 |
| 5,915,024 A | * | 6/1999 | Kitaori et al. | 713/176 |
| 6,772,342 B1 | * | 8/2004 | Hawthorne | 713/176 |
| 6,963,971 B1 | * | 11/2005 | Bush et al. | 713/153 |
| 7,117,367 B2 | * | 10/2006 | Carro | 713/176 |
| 7,194,618 B1 | * | 3/2007 | Suominen | 713/155 |
| 7,373,506 B2 | * | 5/2008 | Asano et al. | 713/168 |
| 7,512,801 B1 | * | 3/2009 | Akiyama et al. | 713/176 |

FOREIGN PATENT DOCUMENTS

JP   2001209308   8/2001
JP   2003338815   11/2003

* cited by examiner

*Primary Examiner*—Christopher A Revak
*Assistant Examiner*—Abdullah Almamun
(74) *Attorney, Agent, or Firm*—Gauthier & Connors LLP

(57) ABSTRACT

A medium having stored thereon a digital signature program used to cause a digital signature generating computer to function as: a digest generation unit which generates a digest from each of a plurality of messages; a collective signature generation unit which generates a single signature, as a collective signature, to be collectively affixed to the digests of the plurality of messages; an additional information generation unit which generates, for one of the plurality of messages, additional information including the collective signature, and information about other message for which the collective signature is generated; and a transmission unit which adds the additional information to the one of the plurality of the messages, and transmits the message to a signature verifying computer for verifying a signature.

14 Claims, 12 Drawing Sheets

| CONTENT ID | RANDOM NUMBER GENERATION TIME INFORMATION | RANDOM NUMER |
|---|---|---|
| ID1 | T1 | r1 |
| ID2 | T1 | r2 |
| ID3 | T1 | r3 |
| ID1 | T2 | r4 |
|  |  |  |

DIGITAL SIGNATURE COMPUTER, SYSTEM, METHOD, AND STORAGE MEDIUM STORING PROGRAM FOR COLLECTIVELY AFFIXING SIGNATURE TO PLURALITY OF MESSAGES

PRIORITY INFORMATION

This application claims priority to Japanese Patent Application No. 2005-204972, filed on Jul. 13, 2005, which is incorporated herein by reference in its entirety.

FIELD OF THE INVENTION

The present invention relates to a digital signature, and more particular to the handling of a signature when the signature is collectively affixed to a plurality of messages.

DESCRIPTION OF THE RELATED ART

As a method for confirming that a message to be exchanged has not been falsified, a digital signature is commonly used. A digital signature is normally affixed to a message by the following procedure. That is, a user who wishes to send a message generates a digest (hash value) by means of a hash function from a message to which a signature is to be affixed, encrypts the digest by means of the user's private key, affixes the encrypted digest to the message, and transmits the message. The information affixed to the transmission message is referred to as a "signature".

A receiver of a message to which a signature is affixed generates a digest from the received message by means of the same hash function as used by the transmitter, decrypts the received signature by means of a public key corresponding to the private key of the transmitter, and compares the digests generated by means of the respective methods. If a result of the comparison shows that the digests completely match, the message is verified not to have been falsified.

In affixing of a digital signature, the integrity of a message (confirming that the message has not been falsified) and the authentication of a message generator can be discriminated by means of a signature as described above. In the following explanation, the process of affixing a digital signature, receiving a message, and confirming the integrity of the message and authenticating a message generator on the signature verifying computer is hereafter referred to as "signature verification" or "message verification".

A digital signature can guarantee the validity of the contents of the message to be exchanged. However, in affixing a digital signature, since a signature is generated from a message as described above, when a plurality of messages are exchanged, a signature is generated for each message. Therefore, the transmitter must generate a signature for each message, which is a laborious process.

Accordingly, in a conventionally employed technique for solving the laborious process of affixing a signature to each message, a single signature affixed to a plurality of messagesis proposed. When, for example, three messages A, B, and C are to be transmitted by means of the related art technique, the transmitter collectively generates the digests of the three messages A, B, and C, encrypts the digests, and generates a single signature. Then, the transmitter affixes the signature generated from the messages A, B, and C to the messages A, B, and C, respectively, and transmits the messages.

A receiver of a message collectively generates the digests of the three received messages A, B and C, decrypts the received signature, generates the respective digests, and compares the digests generated by means of the respective methods.

In the related art method, when a plurality of messages are transmitted, a signature is affixed only once. Therefore, the related art method convenient for a transmitter of a message.

Since the related art ensures that a signature has to be affixed only once, the method is convenient for a transmitter of a message, but the related art method is not always convenient for a message recipient.

For example, when only a message A is to be verified, a message recipient receives unnecessary messages B and C, and cannot verify the message A without generating the digests for the messages B and C. That is, in the related art, a plurality of messages to which a signature is collectively affixed are to be processed together in order to verify each message. Therefore, generating a single signature for a plurality of messages is not always convenient for a recipient.

In this case, if a transmitter classifies messages according to the respective destinations of the messages, and collectively generates a single signature for the classified messages, the problem of the inconvenience for a recipient may be solved. However, in this process, the transmitter cannot collectively generate a single signature without constant awareness of the destination of each message, and managing the destination of each message is troublesome. That is, for a plurality of messages to be transmitted to different destinations, a single common signature cannot be generated, and each message requires its own signature. As a result, the related art technique cannot be used in transmitting a message to different destinations.

As described above, when a single signature is generated for a plurality of messages in the related art, a recipient cannot individually process the messages for which the single signature is generated. That is, there has been a problem that individual verification for messages cannot be performed.

SUMMARY OF THE INVENTION

The present invention has been developed to solve the above-mentioned problems, and an object of the present invention is to provide a digital signature system and method capable of individually verifying signatures affixed to messages even when the signatures are collectively affixed to a plurality of messages.

To attain the object, a storage medium according to the present invention stores a digital signature program used to cause a digital signature generating computer to function as: a digest generation unit which generates a digest from each of a plurality of messages; a collective signature generation unit which generates a single signature, as a collective signature, to be collectively affixed to the digests of the plurality of messages; an additional information generation unit which generates, for one of the plurality of messages, additional information including the collective signature, and information about other message for which the collective signature is generated; and a transmission unit which adds the additional information to the one of the plurality of the messages, and transmits the message to a signature verifying computer for verifying a signature.

Another storage medium according to the invention stores a digital signature program used to cause a signature verifying computer for verifying a digital signature affixed to a message to function as: a reception unit which receives a message to which is added additional information including: a collective signature collectively placed for digests generated from a plurality of messages including the received message; and information about other message for which the collective signature is generated along with the received message; a signature decryption unit which decrypts the collective signature included in the additional information and generates a digest; a digest generation unit which combines a digest of other message obtained according to the information about another message included in the additional information with a digest generated from the message received by the reception unit; and a signature verification unit for verifying the collective signature by comparing the digest generated by the digest generation unit with the digest generated by the collective signature decryption unit.

A further storage medium according to the invention stores a digital signature program used to cause a signature generating computer to function as: a first digest generation unit which generates a digest from each of a plurality of messages; a collective signature generation unit which generates a single signature, as a collective signature, to be collectively affixed to the digests of the plurality of messages; an additional information generation unit which generates, for one of the plurality of messages, additional information including the collective signature, and information about other message for which the collective signature is generated; and a transmission unit which adds the additional information to the one of the plurality of the messages, and transmits the message to a signature verifying computer for verifying a signature, and the program used to cause the signature verifying computer to function as: a reception unit which receives a message transmitted from the signature generating computer; a signature decryption unit which decrypts the collective signature included in the additional information of the received message and generates a digest; a second digest generation unit which combines a digest of another message obtained according to the information about the other message included in the additional information, with a digest generated from the received message; and a signature verification unit for verifying the collective signature by comparing the digest generated by the second digest generation unit with the digest generated by the collective signature decryption unit.

A signature generating computer according to the present invention includes a digest generation unit which generates a digest from each of a plurality of messages; a collective signature generation unit which generates a single signature, as a collective signature, to be collectively affixed to the digests of the plurality of messages; an additional information generation unit which generates, for one of the plurality of messages for which the collective signature is generated, additional information including the collective signature, and information about other message for which the collective signature is generated; and a transmission unit which adds the additional information to the one of the plurality of the messages, and transmits the message to a signature verifying computer for verifying a signature.

A signature verifying computer according to the present invention includes a reception unit which receives a message to which is added additional information including: a collective signature collectively placed for digests generated from a plurality of messages including the received message; and information about another message for which the collective signature is generated along with the received message; a signature decryption unit which decrypts the collective signature included in the additional information and generates a digest; a digest generation unit which combines a digest of another message obtained according to the information about another message included in the additional information with a digest generated from the message received by the reception unit; and a signature verification unit for verifying the collective signature by comparing the digest generated by the digest generation unit with the digest generated by the collective signature decryption unit.

A digital signature system according to the present invention having a signature generating computer which generates a signature to be affixed to a message using a digital signature, and a signature verifying computer which verifies a signature affixed to a message using a digital signature, includes a first digest generation unit which generates a digest from each of a plurality of messages; a collective signature generation unit which generates a single signature, as a collective signature, to be collectively affixed to the digests of the plurality of messages; an additional information generation unit which generates, for one of the plurality of messages, additional information including the collective signature, and information about other message for which the collective signature is generated; a transmission unit which adds the additional information to the one of the plurality of the messages, and transmits the message to a signature verifying computer for verifying a signature; a reception unit which receives a message transmitted from the signature generating computer; a signature decryption unit which decrypts the collective signature included in the additional information of the received message and generates a digest; a second digest generation unit which combines a digest of the other message obtained according to the information about the other message included in the additional information, with a digest generated from the received message; and a signature verification unit for verifying the collective signature by comparing the digest generated by the second digest generation unit with the digest generated by the collective signature decryption unit.

A digital signature method according to the present invention is used by a signature generating computer for generating a signature to be affixed to a message using a digital signature, includes generating a digest from each of a plurality of messages; generating a single signature, as a collective signature, to be collectively affixed to the digests of the plurality of messages; generating, for one of the plurality of messages, additional information including the collective signature, and information about other message for which the collective signature is generated; adding the additional information to the signature-affixed message; and transmitting the message to a signature verifying computer for verifying a signature.

A signature verifying method according to the present invention is used by a signature verifying computer for verifying a signature affixed to a message using a digital signature, includes receiving a message to which is added additional information including: a collective signature collectively placed for digests generated from a plurality of messages including the received message; and information about other message for which the collective signature is generated along with the received message; decrypting the collective signature included in the additional information and generates a digest; combining a digest of the other message obtained according to the information about the other message included in the additional information with a digest generated from the received message; and verifying the collective signature by comparing the digest generated by the digest generation unit with the digest generated by the collective signature decryption unit.

A digital signature method according to the present invention includes generating a digest from each of a plurality of messages; generating a single signature, as a collective signature, to be collectively affixed to the digests of the plurality of messages; generating, for one of the plurality of messages, additional information including the collective signature, and information about other message for which the collective signature is generated; adding the additional information to the signature-affixed message; transmitting the message to a signature verifying computer for verifying a signature; receiving a message to which additional information is added; decrypting the collective signature included in the additional information and generates a digest; combining a digest of the other message obtained according to the information about the other message included in the additional information, with a digest generated from the received message; and verifying the collective signature by comparing the digest generated by the digest generation unit with the digest generated by the collective signature decryption unit.

According to the present invention, when a signature is collectively generated for a plurality of messages in a signature generating computer, the additional information including the information about another message required in verifying a signature is added to a message. Therefore, the signature verifying computer can individually verify a signature affixed to the message without using another message.

BRIEF DESCRIPTION OF THE DRAWINGS

Embodiments of the present invention will be described in detail by reference to the drawings, wherein:

FIG. 10 shows an example configuration of data registered in a random number holding unit according to the third embodiment;

DETAILED DESCRIPTION OF THE INVENTION

Embodiments of the present invention are described below by reference to the attached drawings.

First Embodiment

Figure 1:
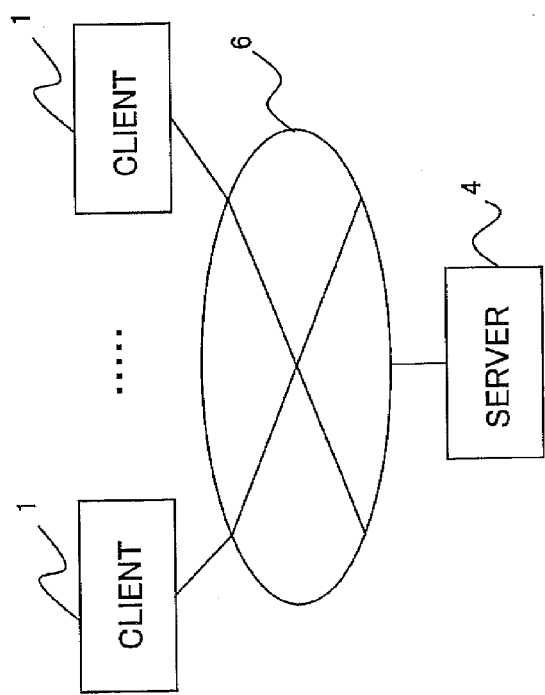
FIG. 1 shows the overall configuration of a first embodiment of the digital signature system according to the present invention.

FIG. 1 shows the overall configuration of an embodiment of a digital signature system according to the present invention. FIG. 1 shows a configuration in which a plurality of clients 1 and a server 4 are connected to a public network 6. In the present embodiment, two types of digital signature verification methods; that is, simple verification and normal verification, are presented. The server 4 corresponds to a signature verifying computer for verifying the signature affixed to contents. The client 1 corresponds to a signature generating computer for generating a signature to be affixed to the contents. In the case of simple verification, the client 1 can also serve as a signature verifying computer for verifying a collective signature affixed to the contents at the request of the signature generating computer.

Figure 2:
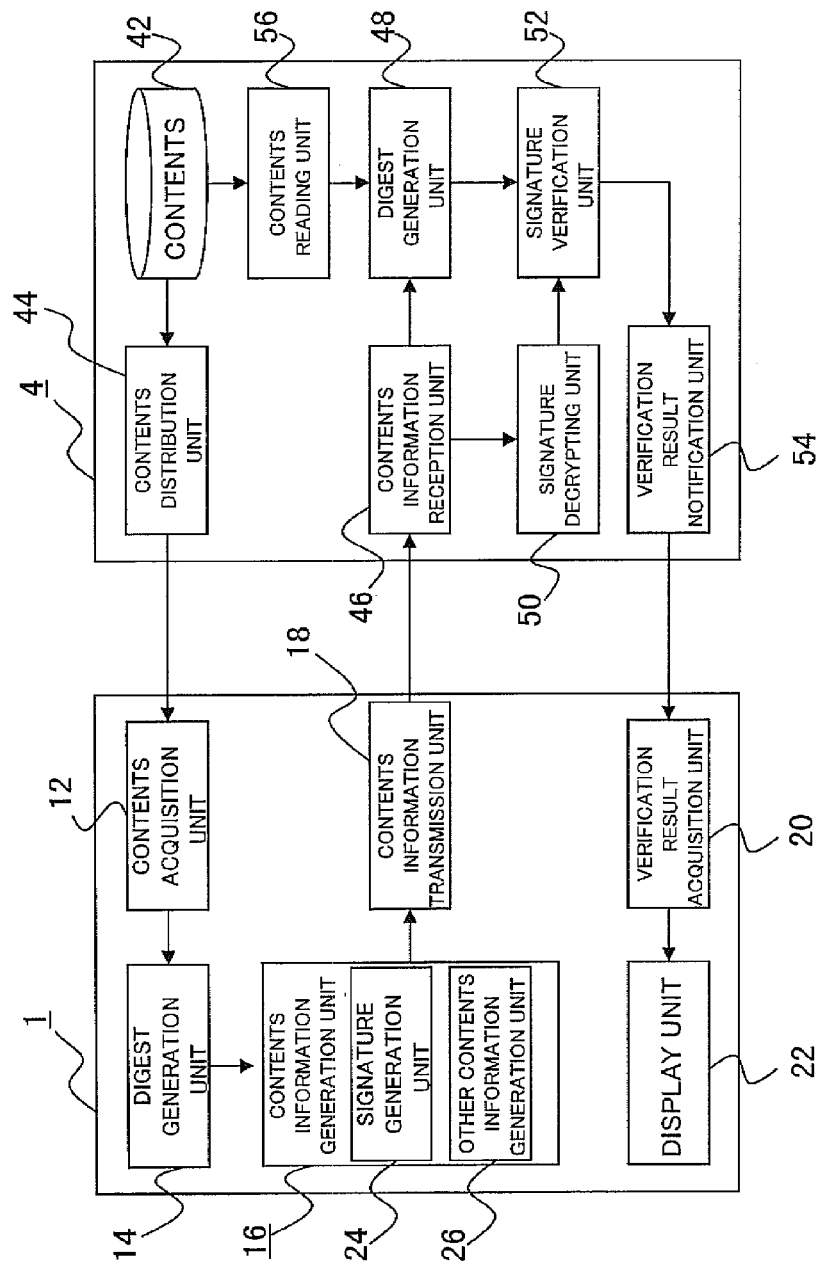
FIG. 2 is a block diagram of the configuration of the digital signature system according to the first embodiment.

FIG. 2 is a block diagram of the configuration of the digital signature system according to the first embodiment of the present invention. In FIG. 2, the client 1 operating as a signature generating computer and the server 4 operating as a signature verifying computer are shown.

The client 1 comprises a contents acquisition unit 12, a digest generation unit 14, a contents information generation unit 16, a contents information transmission unit 18, a verification result acquisition unit 20, and a display unit 22. The contents acquisition unit 12 obtains from the server 4 the contents corresponding to a message to be exchanged. The digest generation unit 14 generates a digest from the contents, by means of a hash function. When a plurality of contents are obtained, the digest generation unit 14 generates a digest for each of the contents. The contents information generation unit 16 generates necessary additional information for signature verification by the server 4, and adds it to the contents, thereby generating contents information to be transmitted to the server 4. A signature generation unit 24 contained in the contents information generation unit 16 generates a signature by encrypting a digest by means of an own private key. The signature generation unit 24 according to the present embodiment generates a single signature to be collectively affixed to a plurality of digests. According to the present embodiment, unlike the case of a normal signature generated for each digest, a plurality of digests are combined, and the above-mentioned single signature is generated for the combined digests. In the present embodiment, the single signature generated for the plurality of digests is referred to as a "collective signature". Another contents information generation unit 26 contained in the contents information generation unit 16 generates, for each of the contents to which a collective signature is to be affixed, the information about other contents for which a collective signature is generated together with the contents. The contents information transmission unit 18 transmits to the server 4 the contents to which the additional information is added. The verification result acquisition unit 20 obtains from the server 4 a result of the signature verification by the server 4. The display unit 22 displays the verification result obtained by the verification result acquisition unit 20. The processing functions of each of the components 12 to 22 of the client 1 are realized by cooperation between the digital signature program having the processing function and the hardware configuring the client 1.

Meanwhile, the server 4 comprises a contents distribution unit 44, a contents information reception unit 46, a digest generation unit 48, a signature decryption unit 50, a signature verification unit 52, a verification result notification unit 54, and a contents reading unit 56. The contents distribution unit 44 downloads the contents stored in a contents database 42 into the client 1 that has requested distribution. The contents information reception unit 46 receives the contents transmitted from the client 1. Additional information is added to the contents. The digest generation unit 48 generates a digest from the contents, by means of a hash function. A hash function used by the digest generation unit 48 is the same as the hash function used by the digest generation unit 14 in each client 1. The signature decryption unit 50 generates a digest by decrypting the collective signature contained in the additional information added to the received contents. The signature verification unit 52 is a unit for verifying the signature affixed to the received contents. The signature verification unit 52 according to the present embodiment verifies a signature by comparing the combined digest formed by combining the digests of a plurality of contents with the digest generated by the signature decryption unit 50 relating to the collective signature to be described later in detail. The verification result notification unit 54 notifies the client 1, serving as a contents source, of the verification result from the signature verification unit 52. The contents reading unit 56 reads the contents from the contents database 42 while using a specified content ID as a key. The processing functions of the components 44 to 56 of the server 4 are realized by cooperation between a digital signature program having processing functions and the hardware configuring the server 4.

Next, the operation according to the present embodiment is explained after a definition is provided for each symbol, variable, etc. used in the explanation of the operation.

First, the contents used as message data to which a signature is affixed are defined as Cx (x=1, 2, . . . , N). A signature area of each content Cx is set as Sx, and a signature information area is set as Ex. The signature area is an area including the data used in generating a digest in the data constituting the contents. The signature information area is a storage area of the information about a signature to be affixed to a digest. In the present embodiment, the signature information area corresponds to an area storing the additional information including a collective signature. The client 1 transmits to the server 4, for each content Cx, a set consisting of the signature area Sx including the data for use in generating a digest and the signature information area Ex including the necessary information for signature verification. Then, a hash function is defined as "f", a content ID for use as the information identifying each content as "IDx", a signature function as "Enc" (signkey, data), a verification function as "Dec" (verifykey, data), a server public key as "Es", a server private key as "Ds", a client public key as "Ec", and a client private key as "Dc". Additionally, a key for encryption/decryption is set for "signkey, verify key" specified for a signature function and a verification function, and encrypted/decrypted data is set for "data".

Figure 3:
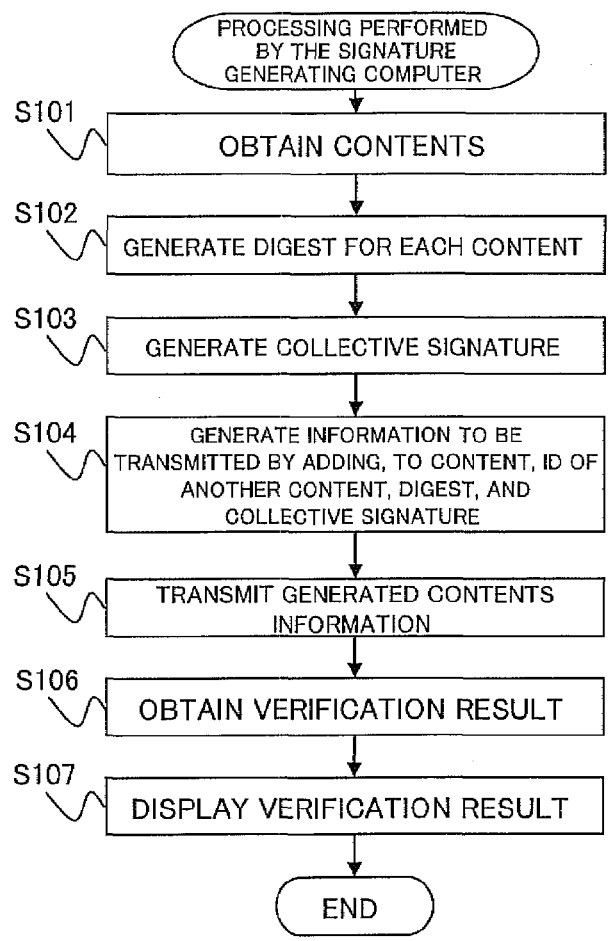
FIG. 3 is a flowchart of processing performed by a signature generating computer according to the first embodiment.
Figure 4:
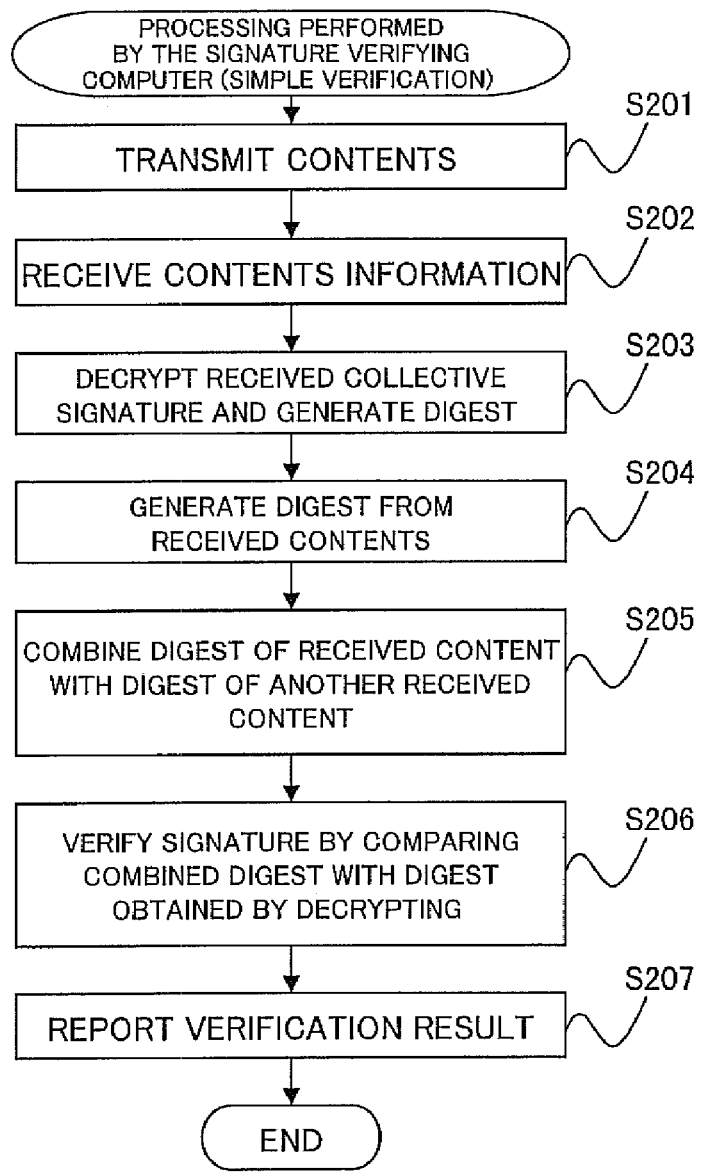
FIG. 4 is a flowchart of processing performed by the signature verifying computer in simple verification according to the first embodiment.
Figure 5:
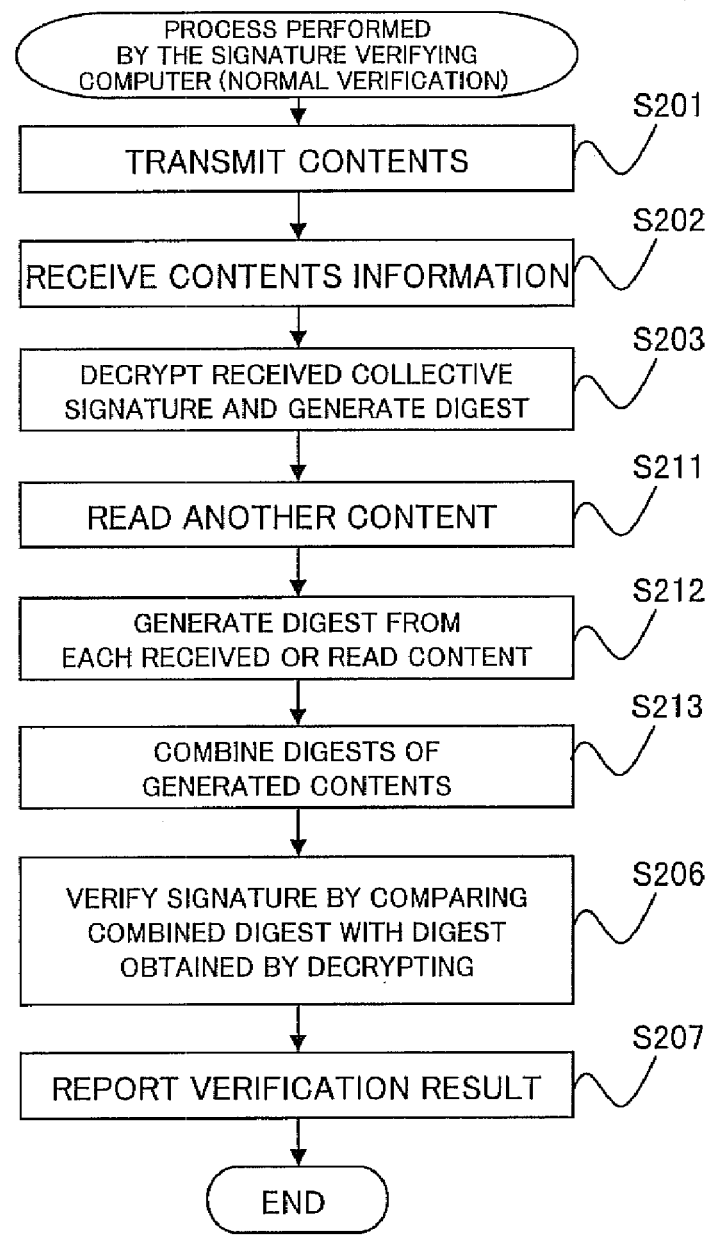
FIG. 5 is a flowchart of processing performed by the signature verifying computer in normal verification according to the first embodiment 1.

By reference to FIGS. 3 to 5 and the above-mentioned defined data and functions, the digital signature according to the present embodiment is explained. According to the present embodiment, two types of digital signature methods; that is, simple verification and normal verification, as described above are provided. First, the simple verification is explained by reference to FIG. 3 showing processing performed by the signature generating computer and FIG. 4 showing processing performed by of the signature verifying computer.

When the contents acquisition unit 12 of the client 1 issues to the server 4 a request to download the contents, the contents distribution unit 44 of the server 4 transmits, to the client 1, N contents Cx (x=1 to N) to which a signature is to be affixed in response to request from the client 1 (step 201). The contents acquisition unit 12 obtains the N contents Cx (step 101). The ID of each of the obtained contents Cx (x=1 to N) is defined as IDx (x=1 to N). By means of a hash function f, the digest generation unit 14 generates N digests f (Sx) from the data contained in the signature area Sx of each obtained content IDx (step 102). Then, by means of its own private key Dc, the signature generation unit 24 collectively affixes a signature to each digest (step 103). If the collective signature is SigValue, the following expression holds.

$$SigValue = Enc\left(D_c, \sum_{X=1}^{N} f(S_x)\right)$$ [Equation 1]

From the result obtained in the above-mentioned processes, the other contents information generation unit 26 generates the following information included in the additional information to be added to each content Cx (step 104). For example, for the content $C_1$ of $ID_1$, the identification information $\{ID_2, ID_3, ID_4, \ldots, ID_N\}$ about other contents for which a collective signature is generated together with $C_1$ and the digests $\{f(S_2), f(S_3), f(S_4), \ldots, f(S_N)\}$ of the other contents are generated as the information about other contents (i.e., contents other than $C_1$). Thus, the IDs of the contents other than the content $C_1$ and the digest are collected. Similarly, for the content $C_2$ Of $ID_2$, the identification information $\{ID_1, ID_3, ID_4, \ldots, ID_N\}$ about other contents for which a collective signature is generated together with $C_2$ and the digests $\{f(S_1), f(S_3), f(S_4), \ldots, f(S_N)\}$ of the other contents are generated.

Given that the contents to which the additional information is added are referred to as "signature-affixed contents", the other contents information generation unit 26 generates the information about other contents except the signature-affixed contents for each of the signature-affixed contents as described above. The information about other contents generated by the other contents information generation unit 26 is used in the signature verification process performed by the signature verifying computer.

The contents information generation unit 16 generates additional information including the signature "SigValue" generated by the signature generation unit 24 and the information about other contents generated by the other contents information generation unit 26, and writes the additional information to the signature information area Ex of each content Cx. For example, the additional information about the content $C_1$ is formed by ($\{ID_2, ID_3, ID_4, \ldots, ID_N\}$, $\{f(S_2), f(S_3), f(S_4), \ldots, f(S_N)\}$, Sigvalue); that is, the contents IDs of other contents, the digests of other contents, and a collective signature. The signature "SigValue" according to the present embodiment has the same value in all contents Cx. The contents information generation unit 16 writes to the signature area Sx the data to which a signature is to be affixed.

The contents information transmission unit 18 transmits to the server 4 the contents to which the additional information is added as described above (step 105). That is, the client 1 transmits, to the server 4, N contents Cx (x=1 to N) which contain the same collective signature but to which different pieces of additional information are added.

In the server 4 on the signature verification side, when the contents information reception unit 46 receives N contents Cx (x=1 to N) transmitted by the client 1 (step 202), it performs the following processing on each content. Since the processes explained below are the same in all contents Cx, the content $C_1$ of $ID_1$ is representatively explained.

First, the signature decryption unit 50 generates a digest by decrypting the collective signature contained in the additional information about the received content $C_1$ while using the public key of the client 1 as a contents transmitter (step 203). Since the digest is generated by means of a verification function, it can be expressed as Dec (Ec, SigValue).

Meanwhile, the digest generation unit 48 generates a digest from the content $C_1$ transmitted from the client 1 (step 204) Strictly speaking, the digest generation unit 48 generates a digest $f(S_1)$ from the data contained in the signature area $S_1$ of the content $C_1$, by means of the hash function f. Since the additional information about the content $C_1$ contains the digests f(Sx) (x=2 to N) of the contents Cx (x=2 to N) other than the content $C_1$, the digest generation unit 48 generates the combined digest F by combining the digests of $f(S_1)$ and f(Sx) (x=2 to N); that is, the digests of all contents Cx (x=1 to N) for which the collective signature "SigValue" has been generated (step 205). The combined digest F can be expressed as follows.

$$F = \sum_{X=1}^{N} f(S_x) \quad \text{[Equation 2]}$$

As described above, when a digest to be compared is generated, the signature verification unit 52 verifies a collective signature affixed to the content $C_1$ by comparing two digests; that is, the digest Dec (Ec, SigValue) obtained in the decryption processing performed by the signature decryption unit 50 and the combined digest F generated by the digest generation unit 48 (step 206).

In the above-mentioned explanation, the content $C_1$ of $ID_1$ is described as an example, but the same holds true for the another contents Cx (x=2 to N). For example, for the content $C_2$ of $ID_2$, the signature decryption unit 50 generates the digest Dec (Ec, SigValue) by decrypting the collective signature "SigValue" contained in the additional information about the received content $C_2$, by means of the public key Ec of the client 1. Meanwhile, the digest generation unit 48 generates the digest $f(S_2)$ from the transmitted content $C_2$, and combines the digest $f(S_2)$ with the digests $f(S_1)$ and f(Sx) (x=3 to N) of the other contents contained in the additional information about the content $C_2$, thereby generating the combined digest F. Thus, by comparing the obtained digests, the collective signature affixed to the content $C_2$ is verified.

In the flowchart, the process of generating a digest by means of the signature decryption unit 50 decrypting a collective signature is performed before performing the process of generating a combined digest by means of the digest generation unit 48. However, the order of the processes can be inverted or the processes can be performed concurrently.

The verification result notification unit 54 notifies the client 1, serving as a signature generator, of the result of the verification performed on all contents Cx (x=1 to N) as described above (step 207).

When the verification result acquisition unit 20 of the client 1 obtains a verification result reported by the server 4 (step 106), the display unit 22 notifies the user of the verification result by displaying the result on the display of the client 1 (step 107).

The simple verification according to the present embodiment is performed as described above. However, in the present embodiment, the digests of other contents required in the signature verification for each content are contained in the additional information about the content. That is, in the case of the digest of another content used when a collective signature is generated; for example, when a collective signature of the content $C_1$ is verified, the signature verifying server 4 does not have to generate a digest from another content Cx (x=2 to N), because the digests f(Sx) (x=2 to N) of the contents Cx (x=2 to N) are contained in the additional information about the content $C_1$. That is, the server 4 can individually verify the collective signature affixed to the content $C_1$ without reference to another content Cx (x=2 to N).

Next, normal verification is explained. However, since the processing performed by the signature generating computer is the same as that performed in the case of simple verification, the explanation is omitted here. In this example, the processing performed by the server 4 acting as the signature verifying computer is explained by reference to the flowchart shown in FIG. 5. Processing steps identical with those performed in simple verification are assigned the same step numbers, and repeated explanations are omitted as appropriate.

In the server 4 on the signature verifying computer side, the contents information reception unit 46 receives N contents Cx (x=1 to N) issued by the client 1 (step 202). As in simple verification, in normal verification the server 4 performs the same process on each content. Therefore, the content $C_1$ of $ID_1$ is explained as an example.

First, the signature decryption unit 50 generates the digest Dec (Ec, SigValue) by decrypting the collective signature contained in the additional information about the received content $C_1$, by means of the public key of the client 1 serving as a content transmitter (step 203).

Meanwhile, the digest generation unit 48 generates a digest $f(S_1)$ from the content $C_1$ transmitted from the client 1 (step 204). Then, the digest generation unit 48 retrieves the identification information $\{ID_2, ID_3, ID_4, \ldots, ID_N\}$ about another content contained in the additional information about the content $C_1$. Then, when the digest generation unit 48 passes the retrieved content ID to the contents reading unit 56, the contents reading unit 56 reads the content from the contents database 42 while using the content ID as a key (step 211). If the server 4 does not hold the contents database 42, the contents reading unit 56 externally acquires contents via a network. Thus, the digest generation unit 48 generates a digest $f(S_1)$ from the content $C_1$ transmitted from the client 1, by means of a hash function f, and generates a digest f(Sx) (x=2 to N) from another content Cx (x=2 to N) read from the contents database 42 (step 212). Thus, since the digests of all contents for which a collective signature is generated can be obtained, the digests are combined to generate a combined digest F (step 213). The combined digest has the same contents as in simple verification.

As described above, when the digest to be compared is generated, the signature verification unit 52 verifies a collective signature affixed to the content $C_1$, by comparing two digests; that is, the digest Dec (Ec, SigValue) obtained in the decryption process by the signature decryption unit 50 and the combined digest F generated by the digest generation unit 48 (step 206). Since the notification and display of a result of verification are the same as in simple verification, the explanation is omitted here.

The normal verification according to the present embodiment is performed as described above, but a collective signature added to the content can also be verified for each content despite a collective signature being generated from a plurality of contents in normal verification as in the case of simple verification.

In the present embodiment, the digest to be compared with the digest generated by decrypting a collective signature contained in the additional information is generated by combining the digests of a plurality of contents. However, the simple verification and the normal verification have different methods of obtaining a digest of a content other than the content (the above-mentioned signature-affixed content) to which a collective signature to be verified is affixed. That is, in the simple verification, the digest of another content other than the signature-affixed content is obtained from the additional information about the signature-affixed content. However, in normal verification, a content is obtained by using, as a key, an ID of another content obtained from the additional information about the signature-affixed content, thereby generating the digest of another content. Depending on the method of obtaining the digest of another content, the verifying methods have the following characteristics.

First, in the case of normal verification, contents themselves are required. Therefore, the server 4 which holds and manages the contents themselves can perform normal verification without externally obtaining the contents. That is, in the case of normal verification, a content ID is to be included in the additional information. Therefore, the digest itself has not been falsified. As a result, the validity of a digital signature can be enhanced.

Meanwhile, simple verification does not require the contents themselves, because the digests of contents are directly received. Therefore, in simple verification, not only the server 4, but also a client 1 that does not hold or manage the contents themselves can verify a signature. That is, when the client 1 performs simple verification, the client 1 can have the configuration of the server 4 shown in FIG. 2 other than the contents distribution unit 44, the contents reading unit 56, and the contents database 42, to thereby operate as a signature verifying computer.

The additional information about a content includes the information about another content the ID of another content and the digest of the other content. As is clear from the explanation of each process of simple verification and normal verification, in simple verification the digest of another content is used as the information about the other content, and in normal verification the ID of another content is used as the information about the other content and the information about the other content is not used. Therefore, the client 1 is not required to include the ID of another content in the additional information if it is clear that simple verification is to be performed. On the other hand, if it is clear that normal verification is to be performed, the digest of another content does not have to be included in the additional information. In the present embodiment, the information about the ID and the digest of another content is included as the information about the other content so that the signature verifying computer can appropriate use either verifying method, depending on its own configuration, etc.

The above-mentioned verification process of a collective signature is explained below by reference to a practical example. Since the contents of the process are the same as those explained above, the below explanation is appropriately simplified. In the following explanation, the contents C1, C2, and C3 respectively have the content Ids; that is, ID1, ID2, and ID3, from which a collective signature is generated. Additionally, the signature areas of the contents C1 to C3 are defined as S1, S2, and S3, and their signature information areas are defined as E1, E2, and E3. First, simple verification is explained, and the contents of processing performed by the signature generating client 1 to be explained first are common among simple verification and normal verification.

In the client 1, when the above-mentioned three contents are obtained by download from the server 4 (step 101), the digests f(S1), f(S2), and f(S3) are generated by means of a hash function f (step 102), and they are collectively encrypted by means of an own private key, thereby affixing a signature (step 103). The collective signature SigValue can be expressed as Enc (Dc, f(S1)+f(S2)+f(S3)). Then, the additional information to be added to each content is generated, and the additional information is expressed as follows.

$$E1=(\{ID2,ID3\}),\{f(S2),f(S3)\},\text{SigValue})$$

$$E2=(\{ID3,ID1\}),\{f(S3),f(S1)\},\text{SigValue})$$

$$E3=(\{ID1,ID2\}),\{f(S1),f(S2)\},\text{SigValue})$$

Figure 6:
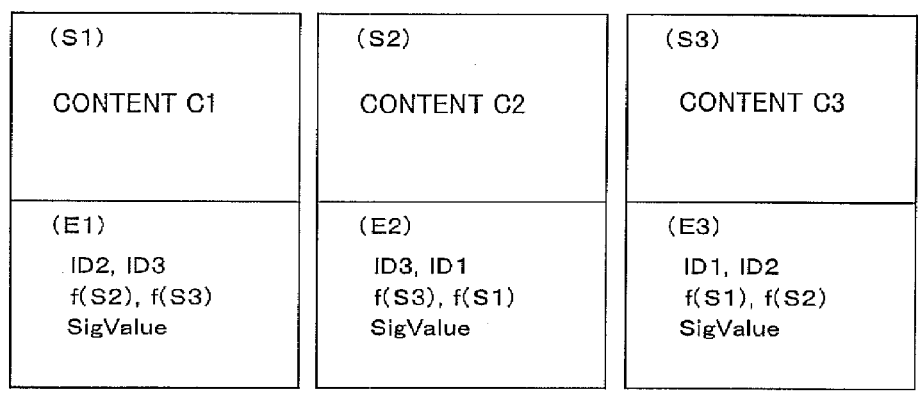
FIG. 6 illustrates the concept of the contents and the additional information transmitted from a client to a server according to the first embodiment.

Thus, the generated additional information is added to the corresponding content (step 104), and is transmitted to the signature verifying server 4 (step 105). FIG. 6 shows the concept of the content information to be transmitted to the server 4. In this example, the server 4 is described as a signature verifying computer in simple verification, but, as described above, it can be replaced with the client 1.

Upon receipt of the content information issued by the client 1 (step 202), the server 4 verifies the collective signature for each content. First, the content C1 of ID1 is considered. The server 4 generates the digest Dec (Ec, SigValue) by decrypting by means of the public key of the client 1 the collective signature "SigValue" contained in the additional information about the content C1 (step 203). The digest generation unit 48 generates the digest f(S1) by means of a hash function f from the received content C1 (step 204), and retrieves the digest f(S2) and f(S3) of other contents from the additional information. Then, the digests are combined into a combined digest F=f(S1)+f(S2)+f(S3) (step 205). Then, the signature verification unit 52 verifies the collective signature added to the content C1 (step 206) by comparing the digest Dec (Ec, SigValue) obtained by decrypting the collective signature with the digest F combined by the digest generation unit 48. By performing the same processing on the contents C2 and C3, the collective signature affixed to the contents C1 to C3 can be individually verified.

Thus, since in simple verification the digest of another content is included in the additional information, a signature can be verified without another content.

Normal verification is explained below, but, since the processing performed by the signature generating computer is the same as that in simple verification, the explanation is omitted here, and processing performed by the signature verifying computer is explained below.

Upon receipt of the contents information issued by the client 1 (step 202), the server 4 individually verifies a collective signature for each content. First, when the content C1 is considered, the signature decryption unit 50 generates a digest Dec (Ec, SigValue) by decrypting the collective signature SigValue contained in the additional information about the content C1, by means of the public key of the client 1 (step 203). The digest generation unit 48 retrieves the ID2 and ID3 of other contents; that is, ID2 and ID3, from the additional information about the content C1, and retrieves the contents C2 and C3 from the contents database 42 (step 211). Then, the digest generation unit 48 generates the digest f(S1) of the content C1 by means of a hash function f, generates the digests f(S2), and f(S3) from the known signature areas S2 and S3 of the contents C2 and C3 (step 212), combines them, and generates a combined digest F=f(S1)+f(S2)+f(S3) (step S213). Then, the signature verification unit 52 verifies the collective signature added to the content C1 by comparing the digest Dec (Ec, SigValue) obtained by decrypting the collective signature with the digest F combined by the digest generation unit 48 (step 206).

As described above, in normal verification, the server 4 obtains from the built-in contents database 42 a content while using the ID of another content as a key, and generates a digest of the other content so that digests can be compared. Thus, since the digest contained in the additional information is not used, the validity of the digital signature can be enhanced. According to the present embodiment, the collective signature added to each of the contents C1 to C3 can be individually verified by similarly performing the processing on the contents C2 and C3.

According to the present embodiment, as explained above, a collective signature added to each content can be individually verified by the signature verifying computer, despite a signature being collectively affixed to a plurality of contents. Thus, since the signature generating computer does not have to affix a signature separately on each content, the problem of affixing a signature on each content can be solved. Meanwhile, the signature verifying computer can verify a collective signature despite failure to transmit the contents other than the content whose collective signatures are to be collectively verified. That is, the digest of each content to which a signature is collectively affixed can be obtained from the digest of another content contained in the additional information in the simple verification, and from the ID of another content included in the additional information in normal verification. Therefore, a digest to be compared with the digest obtained by decrypting the collective signature can be generated by the signature verifying computer. As a result, in the above explanation, the client 1 on the signature generating computer side transmits to the server 4 all contents Cx (x=1 to N) forming a set for which collective signatures are generated, but transmitting a complete set of contents is not required.

As a more practical example, assume that after a client CL0 generates a collective signature from the three contents C1 to C3, the content C1 is transmitted to a client CL1, the content C2 is transmitted to a client CL2, and the content CL3 is transmitted to the server S1. At this time, the client CL1 can verify the collective signature affixed to the content C1 in simple verification. The client CL2 can verify the collective signature affixed to the content C2 in simple verification. Then, the server S1 can verify the collective signature affixed to the content C3 in normal verification. Thus, in order to verify the collective signature, the clients CL1, CL2 and the server S1 of the signature verifying computer have to obtain only the content whose collective signature is to be verified. Then, the client CL0 of the signature verifying computer can affix collective signatures without considering the destination of a content.

Second Embodiment

Figure 7:
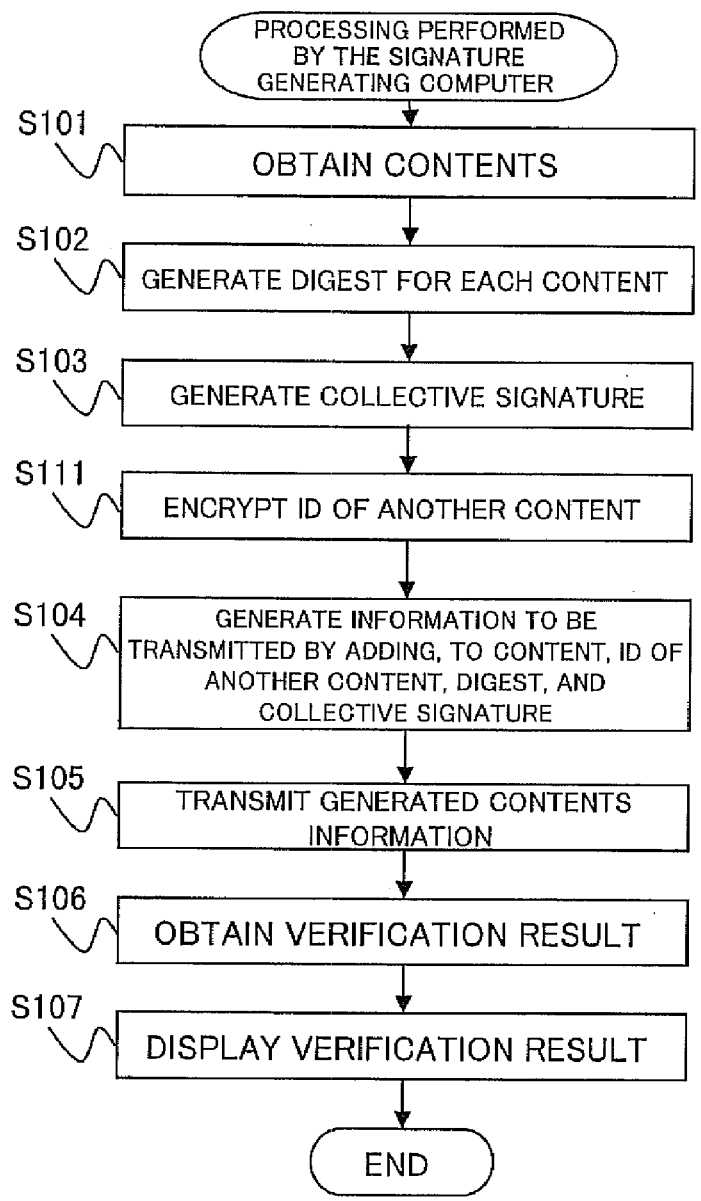
FIG. 7 is a flowchart of processing performed by the signature verifying computer in simple verification according to a second embodiment of the present invention.
Figure 8:
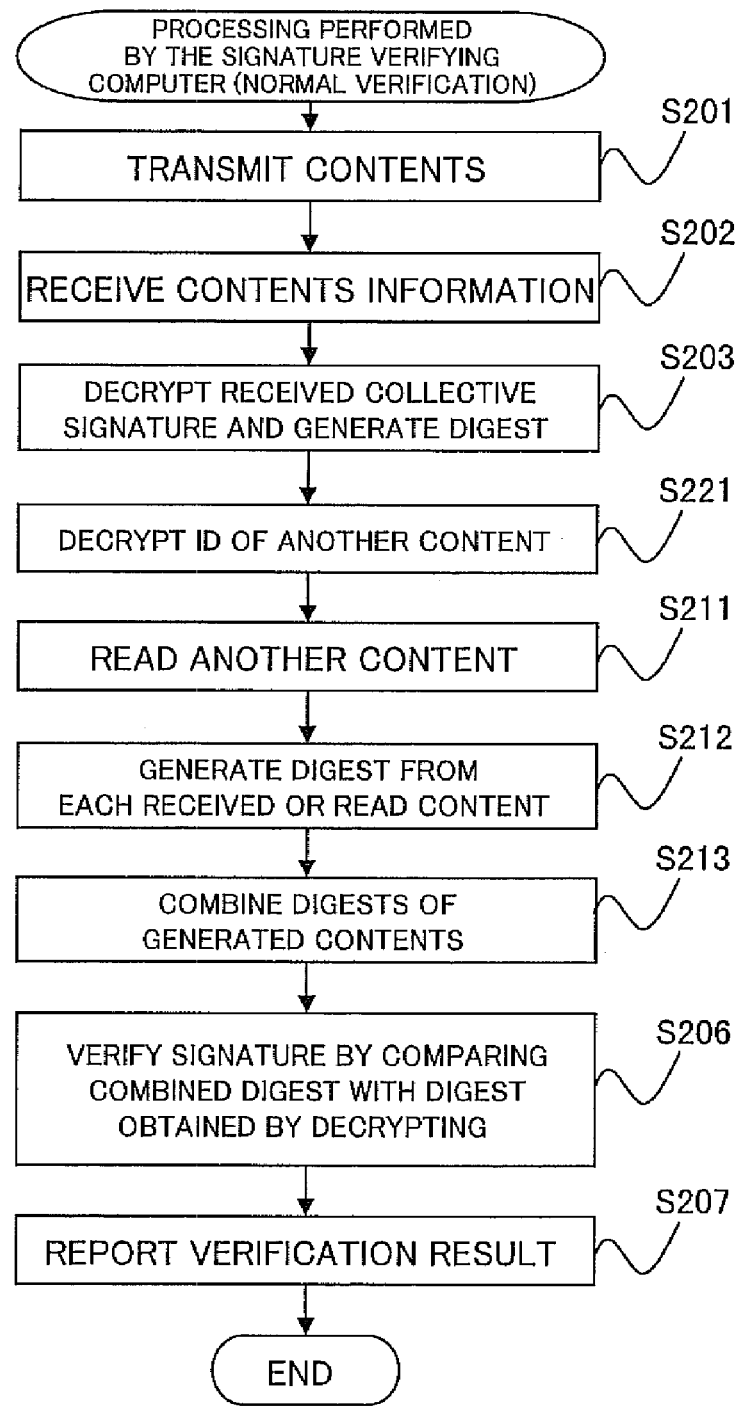
FIG. 8 is a flowchart of processing performed by the signature verifying computer in normal verification according to the second embodiment.

FIG. 7 is a flowchart of processing performed by a signature generating computer according to the second embodiment. FIG. 8 is a flowchart of processing performed by of the signature verifying computer in normal verification. FIGS. 7 and 8 correspond to FIGS. 3 and 5 pertaining to the first embodiment. In contrast with the case of the flowchart shown in FIGS. 3 and 5, the client 1 according to the present embodiment has the feature of encrypting the ID of another content included in the additional information, and transmitting the encryption result to the server 4.

The digital signature process according to the present embodiment is explained below. In this process, as in the first embodiment, the case where the three contents C1, C2, and C3 whose content IDs for which a collective signature is generated are respectively ID1, ID2, and ID3 is explained below. The signature areas of the contents C1 to C3 are respectively S1, S2, and S3, and their signature information areas are respectively E1, E2, and E3. In FIGS. 7 and 8, the same processing steps as in FIGS. 3 and 5 are assigned the same reference numerals, and repeated explanations are appropriately omitted. For simple verification where no content ID is used as the information about another content, the first embodiment 1 employs the same processing. Therefore, the explanation is omitted here. Additionally, since the system configuration according to the present embodiment is the same as in the first embodiment, the explanation is omitted.

In the client 1, when the above-mentioned three contents are obtained by downloading them from the server 4 (step 101), the digest generation unit 14 generates the digests f(S1), f(S2), and f(S3) by means of a hash function f (step 102), and the signature generation unit 24 affixes a signature by collectively encrypting the digests by means of its own private key, and generates a collective signature "SigValue" (step 103). The processing up to this point is the same as that in the first embodiment. Subsequently, the other contents information generation unit 26 according to the present embodiment encrypts the ID of another content by means of the public key Es of the server 4 for performing signature verification, and then includes it in the additional information of each of the contents C1 to C3 (step 111). Thus, the generated additional information is expressed as follows.

$$E1=(Enc(Es,ID2+ID3),\{f(S2),f(S3)\},SigValue)$$

$$E1=(Enc(Es,ID3+ID1),\{f(S3),f(S1)\},SigValue)$$

$$E1=(Enc(Es,ID1+ID2),\{f(S1),f(S2)\},SigValue)$$

Thus, the generated additional information is added to each corresponding content (step 104), and transmitted to the server 4 of the signature verifying computer (step 105).

Upon receipt of the contents information issued by the client 1 (step 202), the server 4 verifies the collective signature for each content. First, the content C1 is considered. The signature decryption unit 50 generates the digest Dec (Ec, SigValue) by decrypting the collective signature SigValue contained in the additional information about the content C1 by means of the public key of the client 1 (step 203). Meanwhile, the digest generation unit 48 retrieves the IDs of other contents; that is, ID2 and ID3, from the additional information about the content C1. According to the present embodiment, since another content ID is encrypted by means of its own public key, the digest generation unit 48 extracts the content ID by performing decryption by means of its private key corresponding to the public key (step 221). The extracted content ID can be expressed as follows.

$$IDx=Dec(Ds,Enc(Es,ID2+ID3))(x=2,3)$$

Thus, the processing after obtaining the ID of another content by decrypting is the same as the processing according to the first embodiment. That is, the digest generation unit 48 retrieves the contents C2 and C3 by issuing an instruction to the contents reading unit 56 (step 211), generates the digests f(S1), f(S2), and f(S3) of the contents C1, C2, and C3 by means of a hash function f (step 212), combines them, and generates a combined digest F=f(S1)+f(S2)+f(S3) (step 213). Then, the signature verification unit 52 verifies the collective signature affixed to the content C1 by comparing the digest Dec (Ec, SigValue) obtained by decrypting the collective signature with the digest F combined by the digest generation unit 48 (step 206). By performing similar processing on the contents C2 and C3, the collective signature affixed to the contents C2 and C3 can be individually verified.

According to the present embodiment, the content ID is encrypted, and then transmitted from the client 1 to the server 4. Therefore, the validity of a digital signature can be improved by preventing falsification of the content ID.

Third Embodiment

Figure 9:
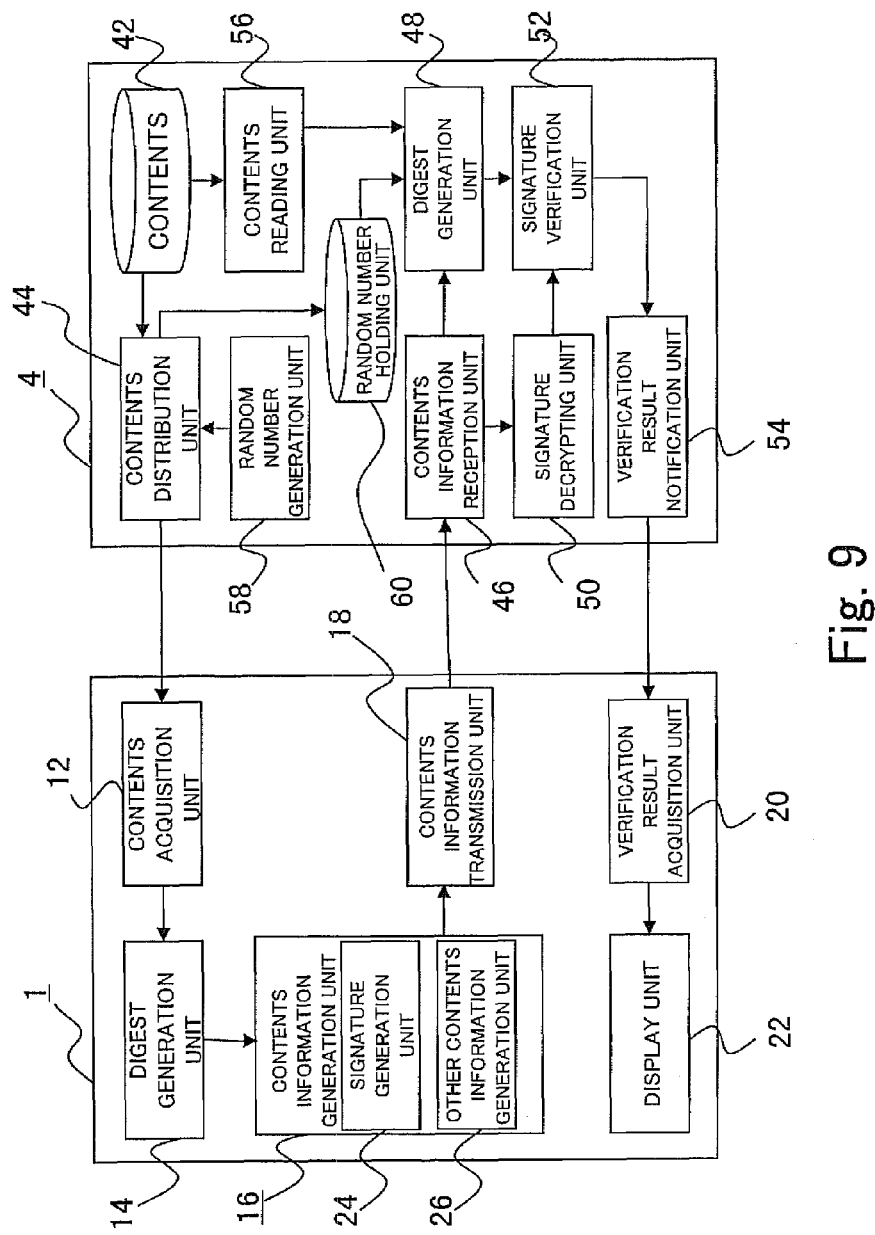
FIG. 9 is a block diagram showing the configuration of a digital signature system according to a third embodiment of the present invention.

FIG. 9 is a block diagram showing the configuration of a digital signature system according to a third embodiment of the invention. In FIG. 9, elements identical with those shown in FIG. 2 are assigned the same reference numerals, and repeated explanation is omitted. According to the present embodiment, a random number generation unit 58 and a random number holding unit 60 are added to the server 4. The random number generation unit 58 is a unit for generating a random number. The random number generated by the random number generation unit 58 is added to the contents along with the random number generation time information, and is downloaded to the client 1. When a content is downloaded, a set consisting of the ID of the downloaded content and random number generation time information is registered in the random number holding unit 60. An example of the configuration of the data registered in the random number holding unit 60 is shown in FIG. 10. The processing function of the random number generation unit 58 is realized by cooperation between the digital signature program having the process function and the hardware of the server 4.

Figure 11:
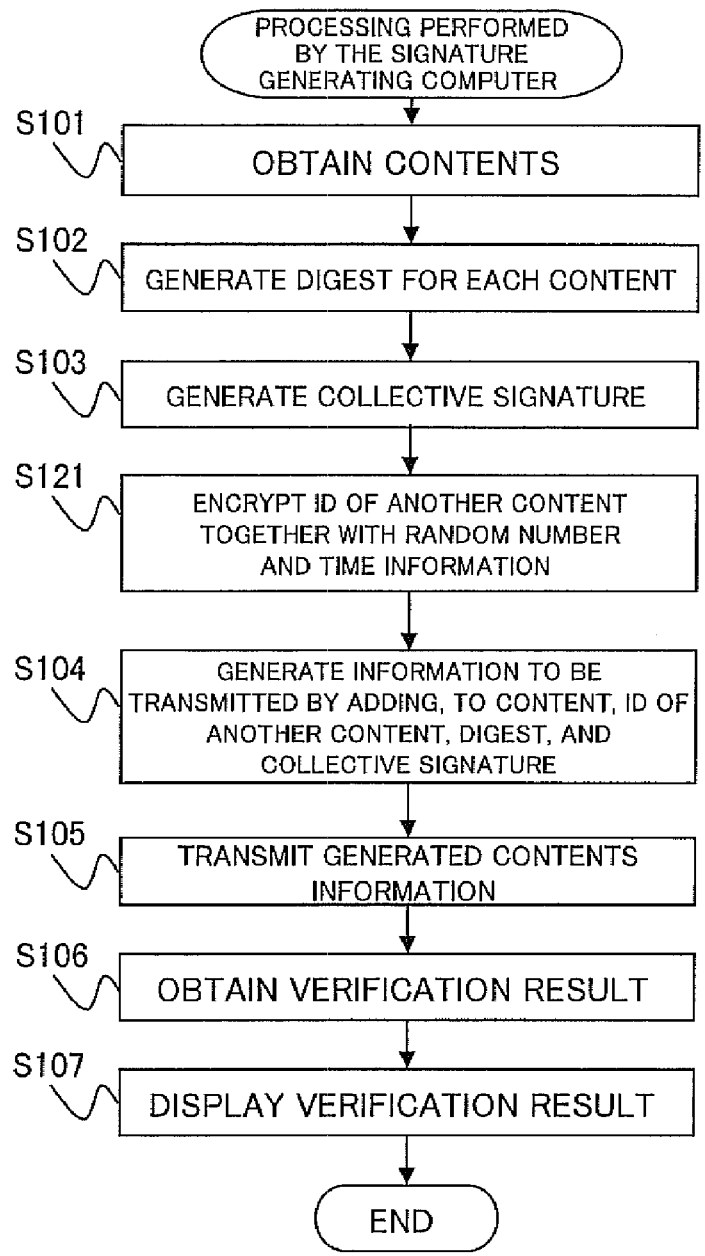
FIG. 11 is a flowchart of processing performed by a signature generating computer according to the third embodiment.
Figure 12:
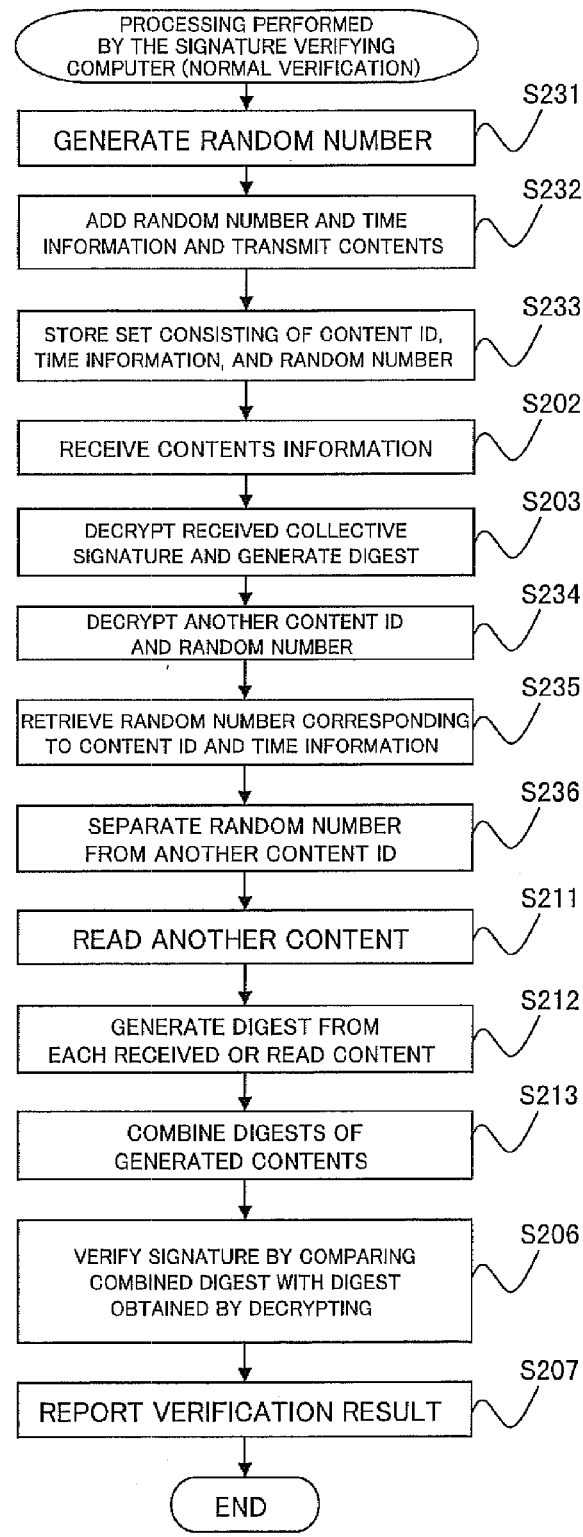
FIG. 12 is a flowchart of processing performed by a signature verifying computer in normal verification according to the third embodiment.

FIG. 11 is a flowchart of processing performed by the signature generating computer according to the present embodiment. FIG. 12 is a flowchart of processing performed by the signature verifying computer in normal verification. FIGS. 11 and 12 correspond to FIGS. 7 and 8 pertaining to the second embodiment. In contrast with the case of the flowchart shown in FIGS. 7 and 8, a random number and random number generation time information are added to another content ID to be included in the additional information, and then encrypted.

The digital signature processing according to the present embodiment is explained below. In this embodiment, as in the second embodiment, the case where the three contents C1, C2, and C3 for whose content IDs for a collective signature is generated are respectively ID1, ID2, and ID3 is explained below. The signature areas of the contents C1 to C3 are S1, S2, and S3, respectively, and their signature information areas are E1, E2, and E3, respectively. In FIGS. 11 and 12, processing steps identical with those shown in FIGS. 7 and 8 are assigned the same reference numerals, and their repeated explanations are omitted as appropriate. For simple verification where no content ID is used as the information about another content, the same processing as that in the first and second embodiments is performed. Therefore, repeated explanation is omitted here.

When the server 4 receives a contents download request from the client 1, the random number generation unit 58 generates a random number for each requested content (step 231). The contents distribution unit 44 retrieves from the contents database 42 the requested contents C1 to C3 to which a signature is to be affixed. To the contents C1 to C3, random numbers r1 to r3 and the respective random number generation time information T1 are added, and the result is transmitted to the client 1 (step 232). The generation time of each random number, T1, is the same among the contents. As shown in FIG. 10, the contents distribution unit 44 registers in the random number holding unit 60 a set consisting of each ID of the transmitted contents C1 to C3, a random number, and random number generation time information (step 233).

In the client 1, when the contents C1 to C3 are obtained from the server 4 (step 101), the digest generation unit 14 generates the digests f(S1), f(S2), and f(S3) by means of a hash function f (step 102), and the signature generation unit 24 affixes a signature by collectively encrypting the digests by means of its own private key, and generates a collective signature "SigValue" (step 103). The processing up to this point is the same as that in the first embodiment. Consequently, the other contents information generation unit 26 according to the present embodiment combines the ID of another content with the random number obtained along with the content, encrypts the result using the public key Es of the server 4, and encrypts the random number time information T1 by means of the public key Es of the server 4, thereby including them in the additional information about each of the contents C1 to C3 (step 121). The additional information generated in the process above is expressed as follows.

$$E1=(Enc(Es,r1+ID2+ID3),Enc(Es,T1),\{f(S2),f(S3)\}, \text{SigValue})$$

$$E2=(Enc(Es,r2+ID3+ID1),Enc(Es,T1),\{f(S3),f(S1)\}, \text{SigValue})$$

$$E3=(Enc(Es,r3+ID1+ID2),Enc(Es,T1),\{f(S1),f(S2)\}, \text{SigValue})$$

Thus, the generated additional information is added to each corresponding content (step 104), and transmitted to the server 4 of the signature verifying computer (step 105).

Upon receipt of the contents information issued by the client 1 (step 202), the server 4 verifies the collective signature for each content. First, the content C1 is considered. The signature decryption unit 50 generates the digest Dec (Ec, SigValue) by decrypting the collective signature SigValue contained in the additional information about the content C1, by means of the public key of the client 1 (step 203). Meanwhile, the digest generation unit 48 extracts the IDs of other contents; that is, the ID2 and ID3, from the additional information about the content C1 as in the second embodiment by performing decryption by means of its own private key (step 234). In the present embodiment, the random number r1 and the random number generation time information T1 accompanying the content ID are to be decrypted. The contents of the decrypting operation are expressed as follows.

$$IDx,r1=Dec(Ds, Enc(Es, r1,+ID2+ID3))$$

where x=2, 3

$$T1=Dec(Ds,Enc(T1))$$

According to the present embodiment, since a random number r1 is combined with the decrypted content ID, the digest generation unit 48 retrieves the random number r1 from the random number holding unit 60, while using as a key a set consisting of the content ID (=ID1) of the content C1 to be verified and the decrypted random number generation time information T1 (step 235). Since in the present embodiment there is the possibility that the content C1 is downloaded a plurality of times by one or more clients 1, a random number can be uniquely designated in a set consisting of the content ID and the random number generation time information. The retrieved random number r1 is subtracted from the decrypting result (IDx, r1), there by extracting IDx (x=2, 3). The subsequent process is the same as that according to the first and second embodiments. That is, the digest generation unit 48 retrieves the contents C2 and C3 by issuing an instruction to the contents reading unit 56 (step 211), generates the digests f(S1), f(S2), and f(S3) of each content by means of a hash function f (step 212), combines them, and generates a combined digest F=f(S1)+f(S2)+f(S3) (step 213). Then, the signature verification unit 52 verifies the collective signature affixed to the content C1 by comparing the digest Dec (Ec, SigValue) obtained by decrypting the collective signature with the digest F combined by the digest generation unit 48 (step 206). By performing similar processing on the contents C2 and C3, the collective signature affixed to the contents C2 and C3 can be individually verified.

According to the present embodiment, the content ID is encrypted, and then transmitted from the client 1 to the server 4. Therefore, as in the second embodiment, the validity of a digital signature can be improved by preventing falsification of the content ID. Furthermore, by combining a random number with a content ID when encryption is performed, the following effects can be attained. In this example, a collective signature added to a content C1 is verified.

For example, assume that an unauthorized user performs an illegal action of rewriting; that is, falsifying contents IDs (=ID2, ID3) in the additional information stored in the signature information area E1 into different contents Ids; for example, ID1 and ID2. Such falsification can be realized by overwriting the additional information about the content C1 with the additional information about the content C3. When a random number is not combined with a content ID, the server 4 can obtain the falsified contents IDs; that is, ID1 and ID2, from the additional information about the content C1. Then, the contents C1 and C2 can be normally obtained from the contents database 42. Thus, after the contents are obtained in a normal manner, the digests are compared. However, the digest compared with those generated by decrypting a collective signature is to be a combined digest generated from the contents C1, C2, and C3, but differs from the contents C1, C2, and C1. Therefore, the digests do not completely match. That is, the collective signature is not successfully verified. In this case, the server 4 can extract the contents IDs (=ID1, ID2) from the additional information in a normal manner, and the contents C1 and C2 are retrieved from the contents database 42 in a normal manner. Therefore, the cause of failure in verification is mistakenly recognized as falsification of the content C1 stored in the signature area S1.

In contrast, when a random number is combined with a content ID, the content management server 4 retrieves a random number of the content C3 obtained by overwriting the content C1; that is, not the random number r1, but the random number r3, as described above. As a result, although the random number r3 is subtracted from IDx, r1 (x=2, 3) from the above-mentioned expression $$IDx, r1 = Dec(Ds, Enc(Es, r1+ID2+ID3))$$

where x=2, 3

ID2 and ID3 cannot be extracted correctly. Therefore, the server 4 cannot retrieve the contents from the contents database 42 in a normal manner. Accordingly, it is correctly recognized that the object of falsification is not the contents data stored in the signature area S1, but the additional information stored in the signature information area E1.

In the present embodiment, the content ID and the random number generation time information are associated with each other and registered in the random number holding unit 60 so that the random number added to the contents can be uniquely designated. Therefore, uniquely designated information is not necessarily limited to the random number generation time information. For example, the information can be the transmission time information about contents, or identification information about an event of downloading.

According to an aspect of the invention, the medium having stored thereon a digital signature program includes the additional information includes a digest of the other message as information about the other message; and the second digest generation unit combines the digest included in the additional information added to the message received by the reception unit, and the digest generated from the received message.

According to another aspect of the invention, the medium having stored thereon a digital signature program includes the additional information includes the message identification information for identification of the other message, as the information about the other message; the digital signature program allows the signature verifying computer to function as an acquisition unit for acquiring a message corresponding to each piece of message identification information contained in the additional information; and the second digest generation unit combines a digest generated from the message obtained by the acquisition unit, and the digest generated from the message received by the reception unit.

According to further aspect of the invention, the medium having stored thereon a digital signature program includes the message identification information for identification of the other message is encrypted by means of a public key of the signature verifying computer; the digital signature program further allows the signature verifying computer to function as an extraction unit for extracting message identification information about the other message by means of decrypting encrypted message identification information contained in additional information by means of a private key corresponding to a public key of the signature verifying computer; and the acquisition unit obtains a message corresponding to each piece of message identification information extracted by the extraction unit.

According to further aspect of the invention, the medium having stored thereon a digital signature program includes the digital signature program further allows the signature verifying computer to function as: a random number generation unit which generates a random number; a message transmission unit which adds the generated random number to a message transmitted to the signature generating computer; and a random number information storage unit which associates message identification information about a message transmitted to the signature generating computer with the added random number and stores the information, and the digital signature program further allows the signature generating computer to function as a reception unit of the signature generating computer which receives a message transmitted from the signature verifying computer, the additional information generation unit combines each piece of message identification information about another message with a random number transmitted from the signature verifying computer, encrypts the identification information by means of a public key of the signature verifying computer, and the random number, and includes in additional information each piece of message identification information and the random number as information about the other message after being encrypted, the extraction unit decrypts, by means of a private key corresponding to the public key of the signature verifying computer, encrypted message identification information and a random number contained in the additional information added to the message received by the reception unit, retrieves from the random number storage unit the random number associated with the message identification information about the message received by the reception unit, separates the random number from the decrypted message identification information on the basis of the retrieved random number, and extracts the message identification information.

According to further aspect of the invention, the digital signature system includes the additional information includes a digest of the other message as information about the other message; and the second digest generation unit combines the digest included in the additional information added to the message received by the reception unit, and the digest generated from the received message.

According to further aspect of the invention, the digital signature system includes the additional information includes the message identification information for identification of the other message, as the information about the other message; the system further comprises an acquisition unit for acquiring a message corresponding to each piece of message identification information contained in the additional information; and the second digest generation unit combines a digest generated from the message obtained by the acquisition unit, and the digest generated from the message received by the reception unit.

According to further aspect of the invention, the digital signature system includes the message identification information for identification of the other message is encrypted by means of a public key of the signature verifying computer; the system further comprises an extraction unit for extracting message identification information about the other message by means of decrypting encrypted message identification information contained in additional information by means of a private key corresponding to a public key of the signature verifying computer; and the acquisition unit obtains a message corresponding to each piece of message identification information extracted by the extraction unit.

What is claimed is:

1. A digital signature generating computer to function as comprising:
    a digest generation unit which generates a plurality of digests from a plurality of messages, each digest being generated from a message;
    a collective signature generation unit which generates a single signature by combining the plurality of digests and encrypting the combined plurality of digests, as a collective signature, to be collectively affixed to the digests of the plurality of messages;
    an additional information generation unit which generates, for one of the plurality of messages, additional information including the collective signature, and information about other message for which the collective signature is generated; and
    a transmission unit which adds the additional information to the one of the plurality of the messages, and transmits the message to a signature verifying computer for verifying a signature.

2. A signature verifying computer for verifying a digital signature affixed to a message comprising:
    a reception unit which receives a message to which is added additional information including:
    a collective signature, the collective signature being generated by combining a plurality of digests generated from a plurality of messages and encrypting the combined plurality of digests, the plurality of messages including the received message; and
    information about other message for which the collective signature is generated along with the received message;
    a signature decryption unit which decrypts the collective signature included in the additional information and generates a digest;
    a digest generation unit which combines a digest of other message obtained according to the information about another message included in the additional information with a digest generated from the message received by the reception unit; and
    a signature verification unit for verifying the collective signature by comparing the digest generated by the digest generation unit with the digest generated by the collective signature decryption unit.

3. A signature generating computer comprising:
    a first digest generation unit which generates a plurality of digests from a plurality of messages, each digest being generated from a message;
    a collective signature generation unit which generates a single signature by combining the plurality of digests and encrypting the combined plurality of digests, as a collective signature, to be collectively affixed to the digests of the plurality of messages;
    an additional information generation unit which generates, for one of the plurality of messages, additional information including the collective signature, and information about other message for which the collective signature is generated; and
    a transmission unit which adds the additional information to the one of the plurality of the messages, and transmits the message to a signature verifying computer for verifying a signature, and the program used to cause the signature verifying computer to function as:
    a reception unit which receives a message transmitted from the signature generating computer;
    a signature decryption unit which decrypts the collective signature included in the additional information of the received message and generates a digest a second digest generation unit which combines a digest of another message obtained according to the information about the other message included in the additional information, with a digest generated from the received message; and
    a signature verification unit for verifying the collective signature by comparing the digest generated by the second digest generation unit with the digest generated by the collective signature decryption unit.

4. The signature generating computer according to claim 3, wherein:
    the additional information includes a digest of the other message as information about the other message; and
    the second digest generation unit combines the digest included in the additional information added to the message received by the reception unit, and the digest generated from the received message.

5. The signature generating computer according to claim 3, wherein:
    the additional information includes the message identification information for identification of the other message, as the information about the other message;
    the digital signature program allows the signature verifying computer to function as an acquisition unit for acquiring a message corresponding to each piece of message identification information contained in the additional information; and
    the second digest generation unit combines a digest generated from the message obtained by the acquisition unit, and the digest generated from the message received by the reception unit.

6. The signature generating computer according to claim 5, wherein:
    the message identification information for identification of the other message is encrypted by means of a public key of the signature verifying computer;
    the digital signature program further allows the signature verifying computer to function as an extraction unit for extracting message identification information about the other message by means of decrypting encrypted message identification information contained in additional information by means of a private key corresponding to a public key of the signature verifying computer; and the acquisition unit obtains a message corresponding to each piece of message identification information extracted by the extraction unit.

7. The signature generating computer according to claim 6, wherein:

the digital signature program further allows the signature verifying computer to function as:

a random number generation unit which generates a random number;

a message transmission unit which adds the generated random number to a message transmitted to the signature generating computer; and a random number information storage unit which associates message identification information about a message transmitted to the signature generating computer with the added random number and stores the information, and the digital signature program further allows the signature generating computer to function as a reception unit of the signature generating computer which receives a message transmitted from the signature verifying computer, the additional information generation unit combines each piece of message identification information about another message with a random number transmitted from the signature verifying computer, encrypts the identification information by means of a public key of the signature verifying computer, and the random number, and includes in additional information each piece of message identification information and the random number as information about the other message after being encrypted, the extraction unit decrypts, by means of a private key corresponding to the public key of the signature verifying computer, encrypted message identification information and a random number contained in the additional information added to the message received by the reception unit, retrieves from the random number storage unit the random number associated with the message identification information about the message received by the reception unit, separates the random number from the decrypted message identification information on the basis of the retrieved random number, and extracts the message identification information.

8. A digital signature system comprising:

a signature generating computer which generates a signature to be affixed to a message using a digital signature; and a signature verifying computer which verifies a signature affixed to a message using a digital signature;

said signature generating computer including, a first digest generation unit which generates a plurality of digests from a plurality of messages, each digest being generated from a message, a collective signature generation unit which generates a single signature by combining the plurality of digests and encrypting the combined plurality of digests, as a collective signature, to be collectively affixed to the digests of the plurality of messages, an additional information generation unit which generates, for one of the plurality of messages, additional information including the collective signature, and information about other message for which the collective signature is generated, and a transmission unit which adds the additional information to the one of the plurality of the messages, and transmits the message to a signature verifying computer for verifying a signature;

said signature verifying computer including, a reception unit which receives a message transmitted from the signature generating computer, a signature decryption unit which decrypts the collective signature included in the additional information of the received message and generates a digest, a second digest generation unit which combines a digest of the other message obtained according to the information about the other message included in the additional information, with a digest generated from the received message, and a signature verification unit for verifying the collective signature by comparing the digest generated by the second digest generation unit with the digest generated by the collective signature decryption unit.

9. The digital signature system according to claim 8, wherein:

the additional information includes a digest of the other message as information about the other message; and the second digest generation unit combines the digest included in the additional information added to the message received by the reception unit, and the digest generated from the received message.

10. The digital signature system according to claim 8, wherein:

the additional information includes the message identification information for identification of the other message, as the information about the other message;

the system further comprises an acquisition unit for acquiring a message corresponding to each piece of message identification information contained in the additional information; and the second digest generation unit combines a digest generated from the message obtained by the acquisition unit, and the digest generated from the message received by the reception unit.

11. The digital signature system according to claim 10, wherein:

the message identification information for identification of the other message is encrypted by means of a public key of the signature verifying computer;

the system further comprises an extraction unit for extracting message identification information about the other message by means of decrypting encrypted message identification information contained in additional information by means of a private key corresponding to a public key of the signature verifying computer; and the acquisition unit obtains a message corresponding to each piece of message identification information extracted by the extraction unit.

12. A digital signature method used by a signature generating computer for generating a signature to be affixed to a message using a digital signature, comprising:

generating, using the signature generating computer, a plurality of digests from a plurality of messages, each digest being generated from a message;

generating, using the signature generating computer, a single signature by combining the plurality of digests and encrypting the combined plurality of digests, as a collective signature, to be collectively affixed to the digests of the plurality of messages;

generating, using the signature generating computer, for one of the plurality of messages, additional information including the collective signature, and information about other message for which the collective signature is generated;

adding, using the signature generating computer, the additional information to the signature-affixed message; and transmitting, using the signature generating computer, the message to a signature verifying computer for verifying a signature.

13. A signature verifying method used by a signature verifying computer for verifying a signature affixed to a message using a digital signature, comprising:

receiving, using the signature verifying computer, a message to which is added additional information;

the additional information including a collective signature, the collective signature being generated by combining a plurality of digests generated from a plurality of messages and encrypting the combined plurality of digests, the plurality of messages including the received message, and information about other message for which the collective signature is generated along with the received message;

decrypting, using the signature verifying computer, the collective signature included in the additional information and generates a digest;

combining, using the signature verifying computer, a digest of the other message obtained according to the information about the other message included in the additional information with a digest generated from the received message; and verifying, using the signature verifying computer, the collective signature by comparing the digest generated by the digest generation unit with the digest generated by the collective signature decryption unit.

14. A digital signature method comprising:

generating, using a signature generating computer, a plurality of digests from a plurality of messages, each digest being generated from a message;

generating, using the signature generating computer, a single signature, as a collective signature by combining the plurality of digests and encrypting the combined plurality of digests, to be collectively affixed to the digests of the plurality of messages;

generating, using the signature generating computer, for one of the plurality of messages, additional information including the collective signature, and information about other message for which the collective signature is generated;

adding, using the signature generating computer, the additional information to the signature-affixed message;

transmitting, using the signature generating computer, the message to a signature verifying computer for verifying a signature;

receiving, using a signature verifying computer, a message to which additional information is added;

decrypting, using the signature verifying computer, the collective signature included in the additional information and generates a digest;

combining, using the signature verifying computer, a digest of the other message obtained according to the information about the other message included in the additional information, with a digest generated from the received message; and verifying, using the signature verifying computer, the collective signature by comparing the digest generated by the digest generation unit with the digest generated by the collective signature decryption unit.

\* \* \* \* \*